MAGNETIC SWITCHING DEVICE

Filed May 10, 1965 3 Sheets-Sheet 1

WITNESSES

Theodore F. Wrobel

James F. Young

INVENTORS
Metro Spewock
& Walter V. Bratkowski
BY E. F. Possessky

ATTORNEY

United States Patent Office 3,284,743

Patented Nov. 8, 1966

3,284,743

MAGNETIC SWITCHING DEVICE

Metro Spewock, Export, and Walter V. Bratkowski, McKeesport, Pa., assignors to Westinghouse Electric Corporation, Pittsburgh, Pa., a corporation of Pennsylvania Filed May 10, 1965, Ser. No. 454,616
8 Claims. (Cl. 335—205)

The present invention relates to magnetic switching devices in which magnetic force is employed to produce snap switching action and more particularly to magnetic switching devices adapted for use as household switches.

In household switches, the use of magnetic switching structure can provide an inherent advantage through the elimination of the usual need for a mechanical coupling between the switch actuator and the actuated contact carrying member or members. Contact movement can thus be effected with virtually imperceptible noise and accordingly the magnetic switch can be substantially equivalent to the mercury switch in silence of operation.

Magnetic switching structure can also be adapted for advantageous use in relays as well as other switching devices such as explosion-proof switches. For explosion-proof operation, the actuator can be located to the exterior of the switch enclosure while the actuated member is located within the switch enclosure without any physical interconnection with the actuator through the enclosure.

In switches generally, it is desirable to avoid contact "teasing" and excessive contact arcing. Contact movement in a switch is thus desirably characterized with rapid "overcenter" or "snap" action, but in typical known magnetic switching devices, operated by means of repulsion between opposed permanent magnets, contact engagement or disengagement is produced with relatively slow movement of the contacts.

In accordance with the broad principles of the present invention, a magnetic switch comprises at least a pair of terminals with a contact electrically connected to one of the terminals and a resilient relatively high current capacity contact carrying arm electrically connected to the other terminal. To provide for contact arm movement, a region or pad of magnetic material having relatively high magnetic permeability is disposed on the contact arm. Flux generating means is operable to produce magnetic flux through a magnetic circuit including the highly permeable contact arm pad and thereby controls with snap action the position of the contact arm and the contacts.

It is therefore an object of the invention to provide a novel switching device which operates with improved magnetic control for use in household, explosion-proof and other switch applications.

Another object of the invention is to provide a novel magnetic switch which operates with improved snap action and which operates with relatively high current-carrying capacity.

An additional object of the invention is to provide a novel magnetic switching device characterized with silent operation.

A further object of the invention is to provide a novel silent switch having improved economy of construction.

It is another object of the invention to provide a novel magnetic switch characterized with silent operation and with improved snap action achieved by means of sliding or rotating movement of permanent magnet means.

It is an additional object of the invention to provide a novel magnetic switch characterized with relatively high current-carrying capacity and operated by permanent magnet means which efficiently withstands the demagnetizing effects of current flow through the switch contacts.

It is a further object of the invention to provide a novel magnetic switch characterized with favorably high contact engagement pressure.

Another object of the invention is to provide a novel magnetic switch in which the contacts are disengaged with sufficiently high force to break any normal contact welding.

It is an additional object of the invention to provide a novel magnetic switch which is readily modifiable to provide single or plural pole operation and single or double-throw operation.

It is a further object of the invention to provide a novel magnetic switch in which operating force on the contact arm has a sharp rise time for improved snap action.

These and other objects of the invention will become more apparent upon consideration of the following detailed description along with the attached drawings, in which.

Figure 3:
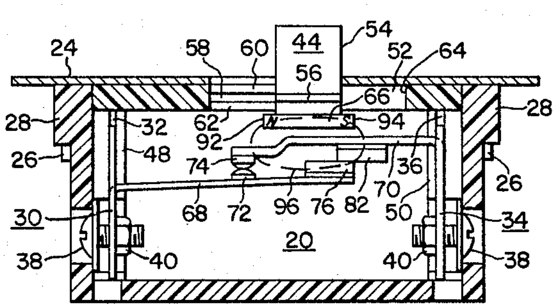
Figure 4:
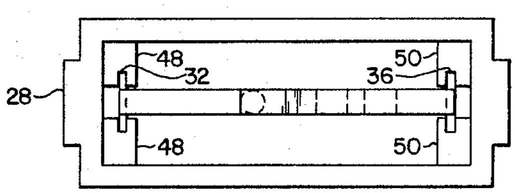
Figure 5:
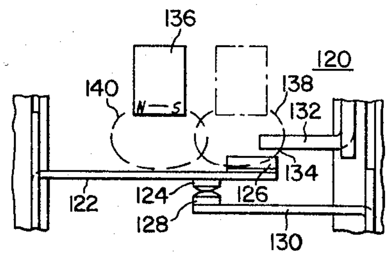
Figure 6:
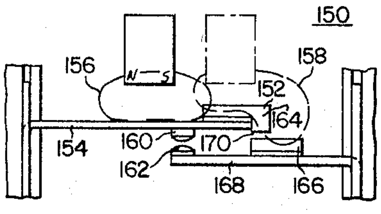
Figure 7:
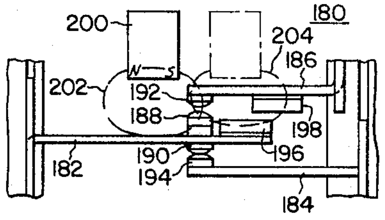
Figure 8:
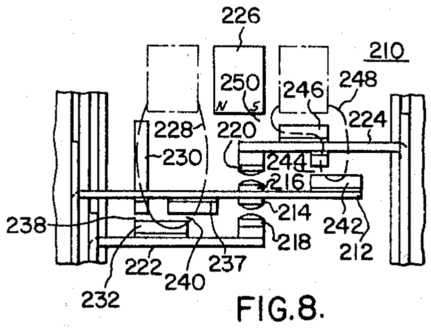
Figure 9:
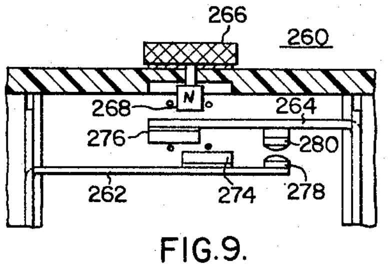
Figure 10:
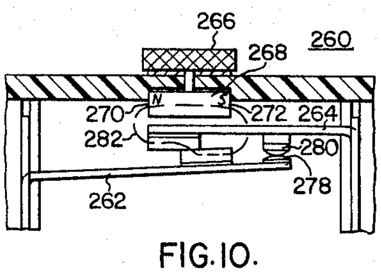
Figure 12:
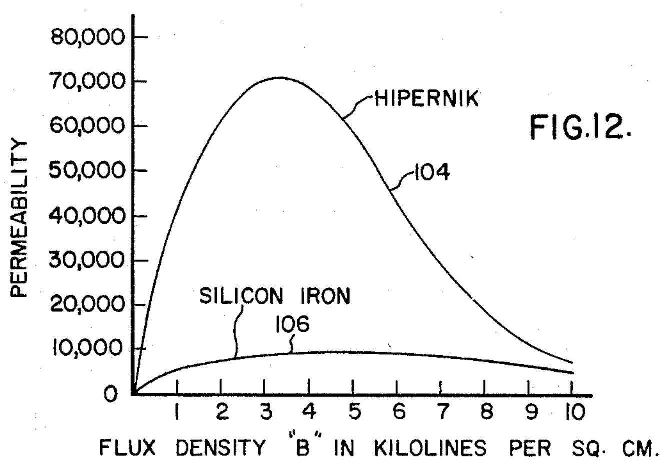
Figure 11:
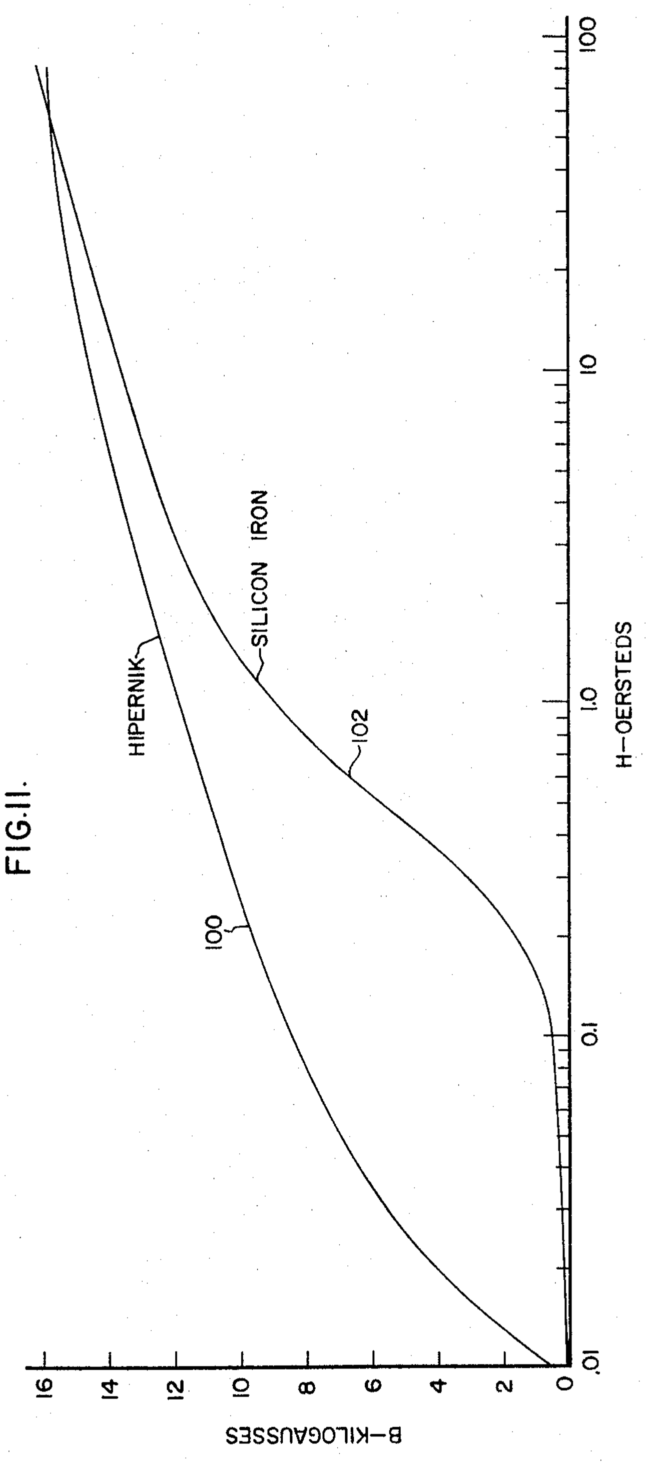
Figure 13:
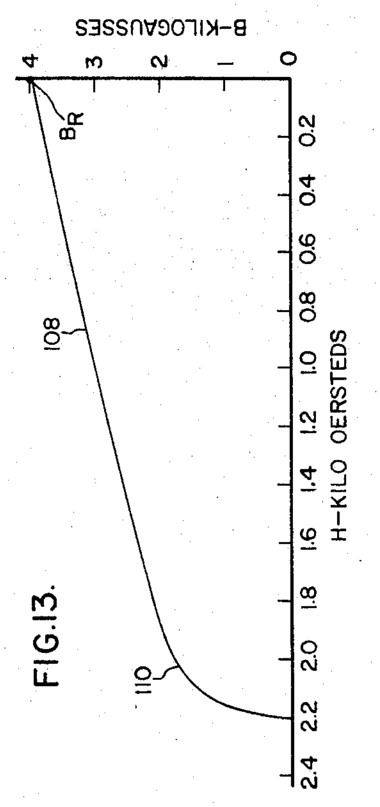

FIG. 3 also shows a longitudinal section with the contacts in engaged relation;

FIG. 4 shows a top plan view of the switch with a handle and an insulative handle supporting plate thereof removed;

FIG. 5 shows a schematic view of the contact and actuating structure of a normally closed switch constructed in accordance with the principles of the invention;

FIG. 6 shows a schematic view of the contact and actuating structure of another normally open switch modification of the invention;

FIG. 7 shows a schematic view of a single-pole double-throw modification of the invention;

FIG. 8 shows a schematic view of a three-position single-pole double-throw modification of the invention;

FIGS. 9 and 10 show schematic views of a rotary actuator modification of the invention with the contacts in disengaged and engaged position respectively;

FIG. 11 shows a graph in which the D.-C. magnetization curve is plotted for a highly permeable magnetic material preferred for use in various embodiments of the invention;

FIG. 12 shows a graph in which the permeability is plotted as a function of flux density for the same material as that referred to in connection with FIG. 11; and FIG. 13 shows a graph in which the demagnetization curve is plotted for a ceramic permanent magnet material preferred for use in forming the switch actuator.

Figure 1:
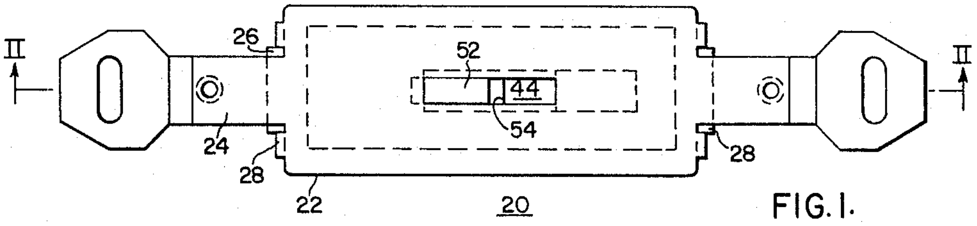
FIGURE 1 is a top plan view of a silent magnetic switch constructed in accordance with the principles of the invention.

More specifically, there is shown in FIG. 1 a magnetic switch device 20 constructed in accordance with the principles of the invention. The device 20 is in the preferred form of a "silent" magnetic switch having special utility in wiring systems of household and building units. As will be described more fully subsequently, the basic switching structure can be embodied in a varied of forms and in a variety of switching devices.

The magnetic switch 20 comprises a conventional insulative housing 22 to which a mounting yoke 24 is secured in a conventional manner by means of yoke tabs 26 formed about housing shoulders 28. A conductive terminal 30 is inserted into the housing 22 and supported in guide slots 32, and a conductive terminal 34 is similarly disposed in the housing 22 in guide slots 36. Wire attachment means in the form of a captive screw 38 and nut 40 are provided on each terminal 30 or 34. An opening in each end wall of the housing 22 offers operating access to the screws 38.

To retain the terminals 30 and 34 in the housing 22 and to support an actuator 44, an insulative plate 46 is seated on housing ledges 48 and 50. The plate 46 has an elongated opening 52 through which a handle 54 of the actuator 44 extends to a front side of the switch for operating access. Ribs 56 on the actuator handle 54 are supported for sliding movement in opposed slots 58 respectively disposed between ridges 60 and 62 extending along the plate opening 52. An enlarged portion 64 of the opening 52 provides for insertion of the handle ribs 56 into the slots 58 during the manufacturing process. In the assembled device, the yoke 24 covers the enlarged opening portion 64 to captivate the handle 54 for sliding movement in the slots 58. The illustrated support arrangement for the actuator 44 is only exemplary, and other sliding support schemes can be used.

Flux generating means in the form of permanent magnet means 66 extend inwardly of the switch 20 and rearwardly from the actuator handle 54 to provide for contact operation. To facilitate manufacture, the entire actuator 44 is preferably formed from an electrically insulative permanent magnet material. However, the operating magnet means 66 can be a permanent magnet material and the handle 54 can be formed from a different material. The handle 54 and the magnet means 66 would then have to be secured together in a suitable manner.

Resilient contact arms 68 and 70 extend inwardly of the housing 22 from the respective terminals 30 and 34. Respective contacts 72 and 74, formed from a highly conductive material such as silver, are welded or otherwise secured to the contact arms 68 and 70 in confronting relation to each other. In this case, the contact arms 68 and 70 are formed so that the contacts 72 and 74 are normally disengaged.

A region or pad 76 of highly permeable magnetic material (with some electrical conductivity in this case) is located between the contact 72 and the free end of the contact arm 68, and it is secured or adhered to an electrically insulative layer 78 which in turn is adhered to a frontally facing side 80 of the contact arm 68. Alternatively, the pad 76 is adhered by insulative cement directly to the contact arm 68.

A similar highly permeable magnetic pad 82 is disposed on a rearwardly facing side 84 of the contact arm 70 and it is located between the contact 74 and the shoulder end of the contact arm 70. An insulative layer 87 is also disposed between the pad 82 and the contact arm 70.

Each magnetic pad 76 or 82 extends along the associated contact arm 68 or 70 for a limited distance. The pad locations on the arms 68 and 70 are such that limited longitudinal portions 86 and 88 of the pads 76 and 82 are disposed in confronting relation to each other with a gap 90 of substantially predetermined magnetic area and length.

To produce contact engagement, magnetic force is applied between the contact pads 76 and 82 by means of the permanent magnet 66. The magnet flux follows a magnetic circuit which, as generally indicated by the reference character 96 in FIG. 3, extends through the pads 76 and 82 and through magnet end surfaces 92 and 94. The resultant attraction force between the magnetic pads 76 and 82 thus resiliently deflects the contact arm 68 or 70 or both contact arms 68 and 70 to produce contact engagement.

Figure 2:
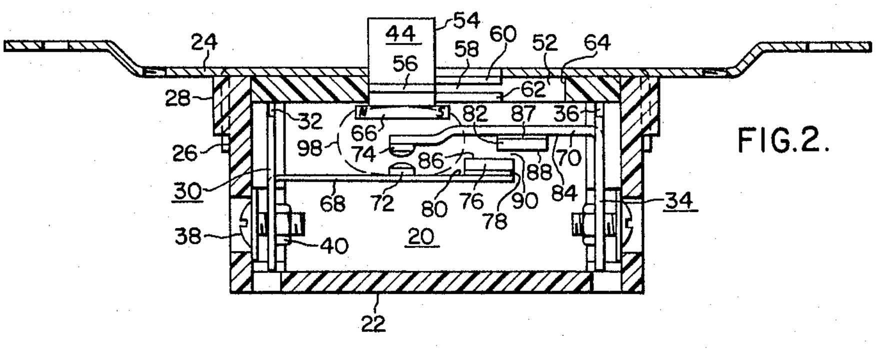
FIG. 2 shows a longitudinal section of the switch with the contacts in normally disengaged relation, taken along the reference line II—II of FIG. 1.

The contact closure is characterized with snap action as the handle 54 is moved from the position shown in FIG. 2 to that shown in FIG. 3 because the forces of attraction between the magnetic pads 76 and 82 rise very rapidly over a very short interval of the total actuator movement. Thus, the magnet 66 produces flux in an open magnetic circuit (as indicated by the reference character 98 in FIG. 2) until the handle 54 is slidably moved to a given point (preferably when it is centrally located) along the plate opening 52, and when the handle 54 is moved slightly beyond that point, the magnet flux is directed through the pads 76 and 82 in the magnetic circuit 96. For a given applied M.M.F., the permeability characteristic of the pad magnetic material is the primary determinant of the rate of flux build-up in the pads 76 and 82 and in turn the rate at which attraction forces between the pads 76 and 82 rise.

Preferably, the pad magnetic material is highly permeable and is saturable at relatively low magnetization force to optimize the "snap" quality of the contact closure. By the use of the descriptor "highly permeable," it is meant herein to refer to a material having relatively high permeability (high B–H slope) at relatively low magnetization force. Since the pads 76 and 82 have limited surface areas of the pad portions 86 and 88 in confronting relation across the gap 90, the gap flux and the resultant forces of attraction are concentrated so as to promote the snap quality of contact movement.

In FIG. 11, there is shown a D.-C. magnetization curve 100 for a highly permeable magnetic material sold under the trade name Hipernik and preferred for use in forming the pads 76 and 82. As a comparison, a curve 102 is also shown for a high-silicon iron magnetic material. The flux density in Hipernik, which is a nickel-iron alloy with small additive amounts of manganese and silicon, rises rapidly to saturation as a function of applied magnetomotive force.

Emphasis of the highly permeable quality of Hipernik is made in FIG. 12 where permeability is plotted against flux density to produce a curve 104. Initial permeability of Hipernik is well in excess of 4000 and its permeability at relatively low magnetization force is relatively high. A permeability curve 106 of high-silicon iron is plotted in FIG. 12 for comparison purposes.

Materials other than Hipernik can be employed for the magnetic pads 76 and 82, but if the permeability qualities of the alternate material are inadequate contact "teasing" can occur because of insufficient snap action, and relatively poor contact engagement can occur because of insufficient magnetic forces of attraction. In contrast, when the pads 76 and 82 are formed from Hipernik or other suitable "highly permeable" magnetic material, well defined snap movement is achieved for the contacts 72 and 74, contact teasing is eliminated, and sufficient magnetic force is developed substantially to prevent contact bounce upon closure or against shock forces.

In order that the described switch operation can be readily achieved in limited space, it is preferred that the magnet 66 or the entire actuator 44 be formed from a permanent magnet material having high coercive force and adequately high remanence or residual flux density. With highly coercive permanent magnetic material, the magnet 66 can be dimensioned with a relatively small length (or length to area ratio) to fit within limited space for movement into and out of flux coupling relation to the pads 76 and 82 and still produce sufficient M.M.F. to pull the pads 76 and 82 together at the force level described.

In FIG. 13, there is shown a demagnetization curve 108 for a preferred permanent magnet material. It is a ceramic or barium ferrite permanent magnet material sold under the trade name Westro-alpha and characterized with relatively high residual flux density ($B_R$) and with relatively high coercive force. Because Westro-alpha has high coercive force, and to some extent because it has relatively high residual flux density, a sizable demagnetizing force must be applied across a Westro-alpha magnet before it is irreversibly demagnetized. Specifically, a demagnetizing force greater than about 1.9 kilooersteds (i.e. below a knee 110 of the curve 108) is required before irreversible loss of flux occurs to demagnetize the magnet.

Demagnetizing flux can occur in the magnet 66 as a result of flux produced by relatively heavy but normal current flowing in the contact arms 68 and 70. However, irreversible demagnetization is avoided in the magnet 66 since it is preferably formed from Westro-alpha or other highly coercive permanent magnet material. Normally, the preferred permanent magnet properties limit the field of permanent magnet material selection to electrically insulative ceramic permanent magnet materials. The entire actuator 44, as previously noted, can thus be conveniently molded from the selected permanent magnet material.

When the actuator 44 is returned to the position of FIG. 2, the magnetomotive force is withdrawn from the magnetic pads 76 and 82 and the forces of attraction diminish or drop to zero to release the contact arms 68 and 70. Under inherent resilient return forces, the contact arms 68 and 70 return to the position of FIG. 2 and the contacts 72 and 74 are disengaged with snap action. Sufficient resilient separating force is generated to break any normally encountered contact welds. The magnetic switch 20 is characterized with silence of operation substantially equivalent to that of commercially available mercury switches. Limited noise is generated by contact engagement but this is virtually imperceptible under use conditions.

If the switch housing 22 is suitably modified, the switch 20 can be used in applications where sparking must be isolated from the atmosphere. Thus, the contact arms 68 and 70 can be sealed in a suitable enclosure (not shown) and the magnet 66 can be supported outside the enclosure for explosion-proof operation.

The following is a table of design data for sample basic switching structure constructed and successfully operated in accordance with the principles of the invention:

| | |
|---|---|
| Material for contact arms **68** and **70** | Beryllium copper |
| Length of contact arm **68**, inches | 2 |
| Length of contact arm **70**, inches | 1⅜ |
| Thickness of contact arms **68** and **70**, inches | .020 |
| Material for contacts **72** and **74** | Silver |
| Thickness of contacts, inches | .021 |
| Gap between contacts **72** and **74**, inches | .025 |
| Rated current for contacts **72** and **74**, amperes | 15 |
| Material for pads **76** and **82** | Hipernik |
| Length of pad **76**, inches | ⅜ |
| Length of pad **82**, inches | ⅜ |
| Thickness of pads **76** and **82**, inches | .020 |
| Thickness of insulative layers **78** and **86**, inches | .014 |
| Overlap area of pads **76** and **82**, inches | .014 |
| Air gap length between pad overlap areas **86** and **88**, inches | .040 |
| Material for magnet **66** | Westro-alpha |
| Length of magnet **66**, inches | ½ |
| Width of magnet **66**, inches | ¼ |
| Approximate frontal spacing of rear side of magnet **66** from pad gap **90**, inches | ⅜ |
| Contact engagement pressure, grams | Approx. 15 |

In FIGS. 5 to 10, there are schematically shown additional exemplary species of the invention which are also readily embodied for use in house wiring systems. These modifications will be described to the extent they differ materially from the switch 20.

A normally closed magnetic switch 120 in FIG. 5 comprises a contact arm 122 carrying a contact 124 and a magnetic pad 126. The main contact 128 is supported on a fixed terminal arm or movable contact arm 130. A separate magnetic pad or arm 132 is suitably supported and located to form a gap 134 with the pad 126. As the sliding actuator magnet 136 is moved to an off position as indicated by magnetic circuit 138, normally engaged contacts 124 and 128 are disengaged with sufficient force to break normal contact welds. When the magnetic pull is released by returning the actuator 136 to an on position as indicated by the magnetic circuit 140, the contacts 124 and 128 are reengaged by inherent resilient return force of the contact arm 122.

In FIG. 6, a normally open magnetic switch 150 differs from the normally open switch 20 of FIGS. 1–4 through the provision of a magnetic pad 152 on the permanent magnet side of contact arm 154. As schematically illustrated by magnetic circuits 156 and 158, contacts 160 and 162 are positively moved between and positively held in engaged as well as disengaged relation by magnetic force. An end portion 164 of the pad 152 extends toward pad 166 on contact arm 168 to provide a suitably dimensioned gap 170 and in turn to provide suitable concentration of magnetic forces of attraction.

A single-pole double-throw magnetic switch 180 is shown in FIG. 7. The switch 180 comprises a resilient movable contact arm 182 and resilient or fixed terminal means or contact arms 184 and 186. Contacts 188 and 190 on opposite sides of the contact arm 182 are disposed for mating engagement respectively with contacts 192 and 194 on the contact arms 184 and 186. Magnetic pads 196 and 198 are provided on the contact arms 182 and 184 in a manner similar to that in which the pads 76 and 82 are provided on the contact arms 68 and 70 in the magnetic switch 20. Normally, the contacts 190 and 194 are in engagement when magnet actuator 200 is disposed to produce flux in magnetic circuit 202. When the magnet 200 is moved to produce flux in magnetic circuit 204, the pad 196 is attracted to the pad 198 and the contacts 190 and 194 are disengaged with snap action while the contacts 188 and 192 are engaged with snap action. When the magnet actuator 200 is returned to the magnetic circuit 202, the normal engagement of the contacts 190 and 194 is reestablished by the resilient return force of the contact arm 182.

To provide three-position single-pole double-throw operation, a magnetic switch 210 is organized as shown in FIG. 8. The switch 210 comprises a movable contact arm 212 having contacts 214 and 216 on opposite sides thereof respectively for mating engagement with contacts 218 and 220 on contact arms 222 and 224. A magnet actuator 226 is disposed for movement into any of three positions.

In a first position, the magnet actuator 226 produces flux in a magnetic circuit 228 through a magnetic pad 230 on the contact arm 212, a magnetic pad 232 on the contact arm 222 and through a return magnetic pad 234. The return pad 234 is suitably supported on the contact arm 212 (as indicated by the reference character 237) and formed with suitable geometry such that the magnetic circuit 228 (including gaps 238 and 240) has sufficiently low reluctance to result in attraction between the magnetic pads 230 and 232. The contact arms 212 and 222 are then resiliently deflected toward each other and the contacts 214 and 218 are engaged.

A magnetic pad 242 is also provided on a free end of the contact arm 212 to form a gap 244 with a magnetic pad 246 on the contact arm 224. When the magnet actuator 226 is disposed in a position to produce flux in magnetic circuit 248, the contact arms 212 and 224 thus are attracted toward each other to result in engagement of the contacts 216 and 220 as the pads 242 and 246 are pulled together. In an intermediate position between the positions wherein the magnetic circuits 228 and 248 are formed, the magnet actuator 226 has no effect on contact engagement or disengagement (as indicated by the reference character 250) and the contacts 214 and 218 and the contacts 216 and 220 are in normally disengaged relation.

The invention can also be embodied in switch structure arranged for rotary actuation as shown in FIGS. 9 and 10. Thus, a switch 260 comprises contact arms 262 and 264 similar to the contact arms 68 and 70 in the switch 20. An actuator 266 is suitably mounted for rotary movement and it is provided with a magnet actuating portion 268 having north and south poles 270 and 272.

The magnet 268 is elongated and when it is in transverse relation to the longitudinal direction of the contact arms 262 and 264, flux is generated in the direction transverse to the longitudinal direction of the contact arms 262 and 264 so as to induce like poles in confronting pad portions 274 and 276. Contacts 278 and 280 remain in normally disengaged relation generally because of lack of attraction force and specifically because of repulsive force between the pad portions 274 and 276. When the actuator 266 is rotated such that the longitudinal direction of the actuator magnet 268 is aligned with the longitudinal direction of the contact arms 262 and 264, the magnet flux is generated along a magnetic circuit (as indicated by the reference character 282) generally in the longitudinal direction of the contact arms 262 and 264. Opposite poles are thus induced in the magnetic pad confronting portions 274 and 276 and the pads are attracted to each other so as to close the contacts 278 and 280 with snap action.

It is thus clear that the contact arm and magnetic pad structure can be embodied in a variety of switch forms. Such variance stems for example from variability in the form and number and location of the magnetic pads, in the number and location of the contacts and the contact arms, and in the type of switch housing or enclosure. Although the permanent magnet actuator is the preferred actuator form, the invention does encompass variations in the actuator or the flux generating means. For example, contact arm and magnetic pad structure can be suitably arranged for operation in a relay in response to flux generating means in the form of a coil on a core.

The foregoing description has been presented only to illustrate the principles of the invention. Accordingly, it is desired that the invention be not limited by the embodiments described, but, rather, that it be accorded an interpretation consistent with the scope and spirit of its broad principles.

What is claimed is:

1. A magnetic switching device comprising a resilient electrically conductive contact arm, first and second contact means disposed on said contact arm, first and second regions of highly permeable magnetic material disposed on said contact arm and electrically isolated therefrom, another electrically conductive contact arm, a third contact means disposed on said other contact arm for mating engagement with said first contact means, a third region of highly permeable magnetic material disposed on said other contact arm and forming a first gap of predetermined area and length with said first magnetic region, a third electrically conductive contact arm, fourth contact means disposed on said third contact arm for mating engagement with said second contact means, a fourth region of highly permeable magnetic material disposed on said third contact arm and forming a gap of predetermined area and length with said second magnetic region, a movable actuator having permanent magnet means, means for supporting said actuator for movement to at least two positions in which said permanent magnet means generates magnetic flux through respective magnetic circuits respectively including said first and third magnetic regions and said second and fourth magnetic regions to produce attraction forces between said first and third magnetic regions and said second and fourth magnetic regions and thereby to engage and disengage said first and third contact means and said second and fourth contact means, and means for supporting said contact arms.

2. A magnetic switching device as set forth in claim 1, wherein said actuator supporting means provides for at least three positions of said actuator and said permanent magnet means including the described two positions, the magnetic flux between said first and third magnetic regions and said second and fourth magnetic regions through the associated gaps being insufficient to result in mutual attraction between the regions when said actuator and said permanent magnet means are in the third position.

3. A magnetic switching device comprising first and second elongated contact arms of material of good electrical conductivity, at least one of said contact arms being resilient, means for supporting the contact arms in parallel relation with at least a portion of the contact arms overlapping, one of the contact arms being supported at one end and the other of the contact arms being supported at its opposite end, a contact member mounted on the free end of the first contact arm, a contact member mounted on an intermediate portion of the second contact arm in position to engage the first-mentioned contact member when the contact arms are moved together, a magnetic member of high magnetic permeability mounted on the free end of the second contact arm, a magnetic member of high magnetic permeability mounted adjacent the first-mentioned magnetic member and positioned so that the two magnetic members at least partially overlap and are separated by a gap when the magnetic members are not magnetized, and actuating means for the switch including permanent magnet means for producing magnetic flux, said actuating means being movable between a position where said flux passes through the magnetic members and a position where the flux does not pass through the magnetic members.

4. A magnetic switching device comprising first and second elongated contact arms of material of good electrical conductivity, at least one of said contact arms being resilient, means for supporting the contact arms in parallel relation with at least a portion of the contact arms overlapping, one of the contact arms being supported at one end and the other of the contact arms being supported at its opposite end, a contact member mounted on the free end of the first contact arm, a contact member mounted on an intermediate portion of the second contact arm in position to engage the first-mentioned contact member when the contact arms are moved together, a magnetic member of high magnetic permeability mounted on the free end of the second contact arm, a magnetic member of high magnetic permeability mounted on an intermediate portion of the first contact arm in a position such that the two magnetic members at least partially overlap and are separated by a gap when the magnetic members are not magnetized, and actuating means for the switch including permanent magnet means for producing magnetic flux, said actuating means being movable between a position where said flux passes through the magnetic members and a position where the flux does not pass through the magnetic members.

5. A magnetic switching device as defined in claim 4 in which the actuating means is movable rectilinearly in a direction parallel to the contact arms between a position adjacent the magnetic members and a position remote from the magnetic members.

6. A magnetic switching device as defined in claim 4 in which the actuating means includes a generally rectangular permanent magnet and is rotatable in a plane parallel to the contact arms between a position where the permanent magnet is substantially parallel to the contact arms and a position where the permanent magnet is transverse to the contact arms.

7. A magnetic switching device comprising a housing, first and second elongated contact arms disposed in the housing, said contact arms being made of a material of good electrical conductivity and at least one of the contact arms being resilient, means for supporting the contact arms in parallel relation with at least a portion of the contact arms overlapping, one of the contact arms being supported at one end and the other of the contact arms being supported at its opposite end, a contact member mounted on the free end of the first contact arm, a contact member mounted on an intermediate portion of the second contact arm in position to engage the first-mentioned contact member when the contact arms are moved together, a magnetic member of high magnetic permeability mounted on the free end of the second contact arm, a magnetic member of high magnetic permeability mounted adjacent the first-mentioned magnetic member and positioned so that the two magnetic members at least partially overlap and are separated by a gap when the magnetic members are not magnetized, said housing having a cover member overlying the contact arms, and actuating means supported on the cover and movable thereon, said actuating means including a permanent magnet and being movable between a position where the magnetic flux of the permanent magnet passes through said magnetic members and a position where the flux does not pass through the magnetic members.

8. A magnetic switching device comprising a housing, first and second elongated contact arms disposed in the housing, said contact arms being made of a material of good electrical conductivity and at least one of the contact arms being resilient, means for supporting the contact arms in parallel relation with at least a portion of the contact arms overlapping, one of the contact arms being supported at one end and the other of the contact arms being supported at its opposite end, a contact member mounted on the free end of the first contact arm, a contact member mounted on an intermediate portion of the second contact arm in position to engage the first-mentioned contact member when the contact arms are moved together, a magnetic member of high magnetic permeability mounted on the free end of the second contact arm, a magnetic member of high magnetic permeability mounted on an intermediate portion of the first contact arm in a position such that the two magnetic members at least partially overlap and are separated by a gap when the magnetic members are not magnetized, said housing having a cover member overlying the contact arms, and actuating means supported on the cover and movable thereon, said actuating means including a permanent magnet and being movable between a position where the magnetic flux of the permanent magnet passes through said magnetic members and a position where the flux does not pass through the magnetic members.

References Cited by the Examiner

UNITED STATES PATENTS

| | | | |
|---|---|---|---|
| 2,323,910 | 7/1943 | Hubbell | 200—87 |
| 2,945,928 | 7/1960 | Houser | 200—87 |
| 2,985,734 | 5/1961 | Howell et al. | 200—87 |
| 2,987,593 | 6/1961 | Alley | 200—87 |
| 3,025,372 | 3/1962 | Benson | 200—87 |
| 3,043,931 | 7/1962 | Gruber | 200—87 |

FOREIGN PATENTS

| | |
|---|---|
| 894,378 | Great Britain. |

BERNARD A. GILHEANY, *Primary Examiner.*

B. DOBECK, *Assistant Examiner.*